No. 622,876. Patented Apr. 11, 1899.
E. E. ALLYNE & R. G. ANDERSON.
GAS ENGINE.
(Application filed Apr. 30, 1898.)
(No Model.)
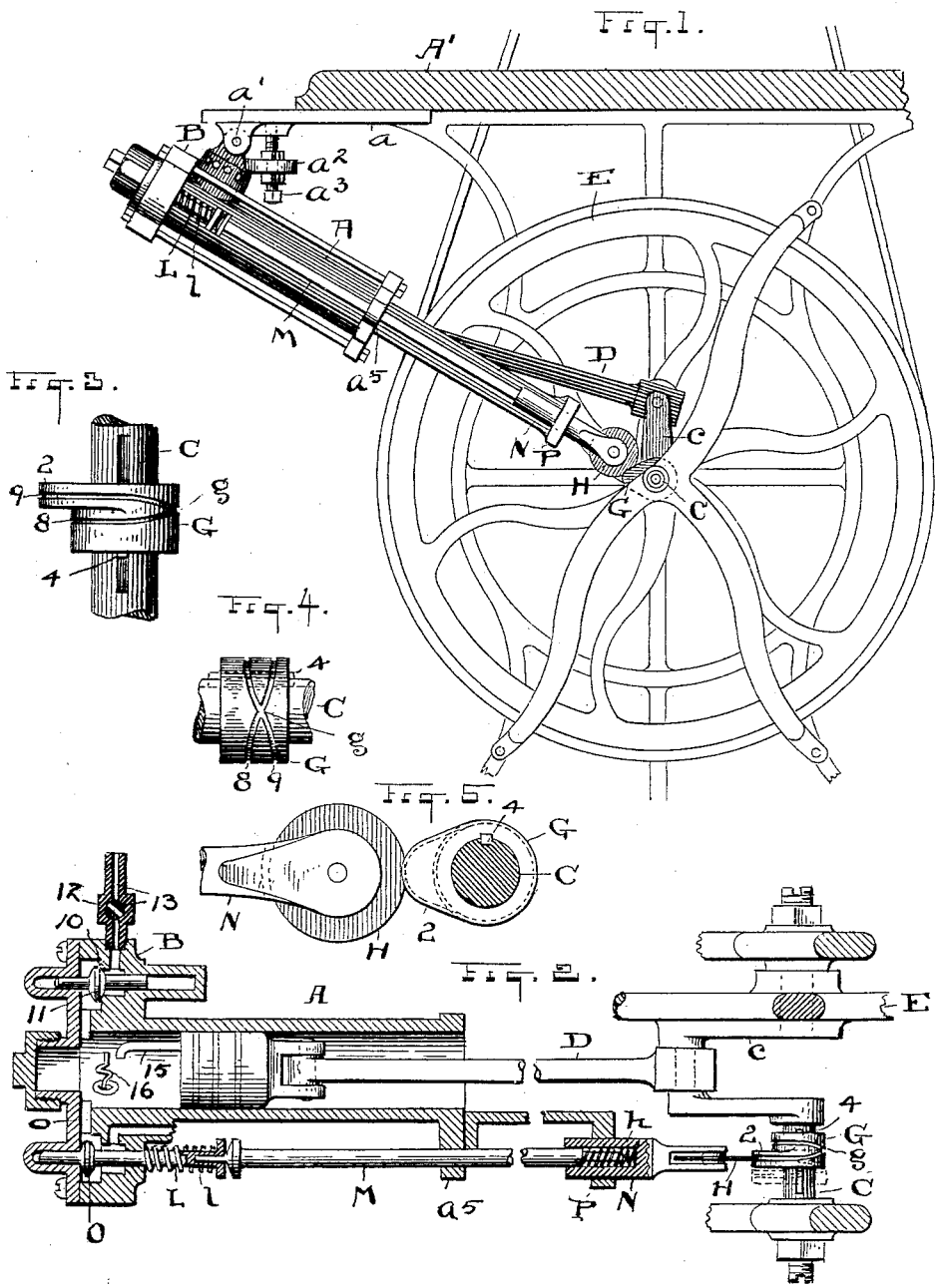
ATTEST
R. B. Moser
H. E. Murn.
INVENTORS.
EDMUND E. ALLYNE.
RALPH G. ANDERSON.
BY
H. F. Fisher
ATTY
THE NORRIS PETERS CO., PHOTO-LITHO., WASHINGTON, D. C.

UNITED STATES PATENT OFFICE.

EDMUND E. ALLYNE AND RALPH G. ANDERSON, OF CLEVELAND, OHIO.

GAS-ENGINE.

SPECIFICATION forming part of Letters Patent No. 622,876, dated April 11, 1899.

Application filed April 30, 1898. Serial No. 679,289. (No model.)

*To all whom it may concern:*

Be it known that we, EDMUND E. ALLYNE and RALPH G. ANDERSON, citizens of the United States, and residents of Cleveland, in the county of Cuyahoga and State of Ohio, have invented certain new and useful Improvements in Gas-Engines, of which the following is a specification.

This invention relates to improvements in gas-engines; and the invention consists in the construction substantially as shown and described, and particularly pointed out in the claims.

In the accompanying drawings, Figure 1 is a sectional elevation of a part of a sewing-machine frame carrying an engine and connecting and operating mechanism between engine and shaft, as hereinafter described. Fig. 2 is an enlarged part sectional and part plan view of the engine and other operating parts. Figs. 3 and 4 are plan views from different points of the cam and section of the shaft. Fig. 5 is a side elevation of the cam and disk in operative relation.

Now, having reference to the accompanying drawings, A represents the cylinder of a gas engine or motor having a head B, through which it is shown as supported from the table A' of the sewing-machine. Preferably the manner of connecting with table A' is by means of an adjustable pivot, so as to give any desired angle of inclination to the engine, the means in this instance consisting of a bracket extension $a$, secured to table A' and having the cylinder-head B pivoted thereon at $a'$ and provided with a finger $a^2$ and adjusting-screw $a^3$ therein bearing against the bracket $a$ and fixing the angle.

C represents a shaft driven by the motor, having a crank $c$, and D is the piston-rod connected with the said crank. E is the balance or fly wheel on said shaft.

G represents the cam or cam collar or sleeve, designed in the present mechanism to actuate the exhaust-valve of the engine. The said cam has the form of an ordinary cylindrical sleeve and is of equal cross-section at all points from end to end, except that at one end there is an abrupt lateral cam projection 2. This projection occupies at its base only about one-third of the circumference or circular area of the sleeve measured around, leaving the remaining surface plain, and it tapers on both edges to a comparatively short rounded point. A comparatively shallow and narrow continuous double groove channel or track extends around the sleeve, and for convenience of description said track or channel is considered as two tracks 8 and 9, which are parallel, except at one point $g$, where they cross, and this is directly opposite the cam or projection 2. The track 9 traverses the cam 2 and the track 8 the plain end of the sleeve. Now in order to understand this construction and operation reference is had to the exhaust-valve O of the engine and the sectional stem L M N and wheel H, through which said valve is actuated intermittently from or by the cam. It will be noticed that the section L carries valve O and has a limited direct or axial sliding movement in the head B. About the said section or rod outside of head B is a spiral spring $l$, bearing against the said head at one end and against a flange on said rod at the other end and designed to actuate the valve in the direction opposite to its actuation by cam G. The section M of the valve-rod has a loose or swivel connection with section L and is engaged therein and through the flange $a^5$ on the cylinder A, so as also to have only a rectilinear or direct movement, though it might be axially rotatable in these bearings, if preferred.

The head N forms the outer section of the valve rod or stem and is supported in the fixed arm P, so as to have only a direct lengthwise back-and-forth and slight axial rotary movement therein, but no vibratory or pendulum-like movement whatever. The middle section M of the said rod has a reduced extremity entering the socket in head end N, and about this is a spiral spring $h$, which is fixed at one end to the portion M and at the other to the portion N and serves by torsional action to keep the wheel or disk H normally in an upright position. Then as said disk H crosses from one track to the other and is slightly inclined in doing this the spring $h$ alone will right it and rotate the head N back as soon as the direct travel of the cam is reached. The track in the cam has this tendency; but the spring supplements the work of the track, which is comparatively shallow.

When the exhaust-valve which controls passage o is to be opened, the disk H rides over the cam g; but said disk or wheel remains in the other portions of the tracks 8 and 9 during the time gas is supplied and compressed in the cylinder and the explosion and subsequent expansion occur. At these times the exhaust-valve is closed by spring l. Three movements of the piston D in the cylinder A therefore necessarily intervene while the valve-controlling wheel H is traversing the tracks 8 and 9 off the cam 2, and the said wheel H travels once and two-thirds around the sleeve each time after leaving the cam before reascending, and these movements are kept up continuously and automatically and of course are timed with respect to the action of the other parts of the engine. The exhaust-valve O is opened when the piston makes its first return stroke after an explosion, and said valve closes on the reverse stroke when a fresh supply of gas is drawn in. This having occurred, the compression-stroke of the piston takes place, and following this the explosion or power stroke. During these three strokes the wheel H is making the rounds of the channels 8 and 9 off the cam projection 2 and getting round to mount said cam in time to provide for the exhaust stroke, which is necessarily short and quick, requiring a cam that has an abrupt turn from the ascent to the descent, so as to allow instant closure of the exhaust-valve.

In the foregoing operation the cam-sleeve G must adapt itself to the laterally-fixed and limited position of the wheel H, because said wheel is carried by a head which can only turn and slide axially, but cannot vibrate laterally to follow the grooves 8 and 9 here and there. Hence the said sleeve is adapted to slide on its shaft to meet the otherwise fixed relation of wheel H, a spline 4 confining it.

The gas enters through port 10 past valve 11, which acts automatically with the engine, and a gas and air controlling outlet valve or cock 12 is shown here as arranged in the gas-passage 13 to said valve 11.

Ignition of the gas occurs through contact of the finger 15 on piston D with the platinum igniter 16, which is insulated in a threaded plug screwed into the cylinder and removable with said ignition.

What we claim is—

1. The shaft and the reciprocally-sliding cam-sleeve thereon having a cam at one side and two tracks around the sleeve intersecting at one point, and one of which passes over the said cam, in combination with a rod actuated by said cam-sleeve, bearings confining the rod to linear and rotary axial movements, and a disk journaled on said rod and running in the tracks of said cam-sleeve, whereby the said sleeve is reciprocated on its shaft by said rod and disk, and the rod is reciprocated axially, substantially as described.

2. The shaft and the cam-sleeve thereon having a cam at one side and two tracks around the sleeve, one of which passes over said cam and said tracks crossing each other off the cam, in combination with an axially-rotatable and axially-reciprocating rod and a revolving disk journaled thereon and traveling in said tracks, and supports for said rod in which the rod is confined to axial movements, whereby the said sleeve causes the said rod to reciprocate axially in its supports, and the rod and disk cause the sleeve to reciprocate to and fro on its shaft, substantially as described.

3. The valve-rod comprising the sections M and N having a socket-and-spring connection, and bearings for said rod constructed to prevent vibratory movements of the rod, in combination with the actuated shaft, a sliding cam-sleeve on said shaft having two tracks about the same crossing each other at one point and a cam thereon traversed by one of said tracks, and a rolling disk on the valve-rod running in the tracks on said cam-sleeve, substantially as described.

4. The valve-rod consisting of a middle section M and end sections L and N loosely connected, a valve-seating spring on the inner section, L, to seat the valve, and a torsional spring h to rotate the head-section N, and fixed bearings in which said rod is limited to axial movements, in combination with a shaft and a double-tracked cam slidably supported thereon, and a revolving disk on the said valve-rod running in the tracks of said cam and causing the cam to slide to and fro, substantially as described.

Signed by us, at Cleveland, Ohio, this 8th day of February, 1898.

EDMUND E. ALLYNE.
   RALPH G. ANDERSON.

Witnesses:
 H. T. FISHER,
 R. B. MOSER.